L. & S. P. Holden.
Boots & Shoes.
No. 1841. Reissued Dec. 27. 1864
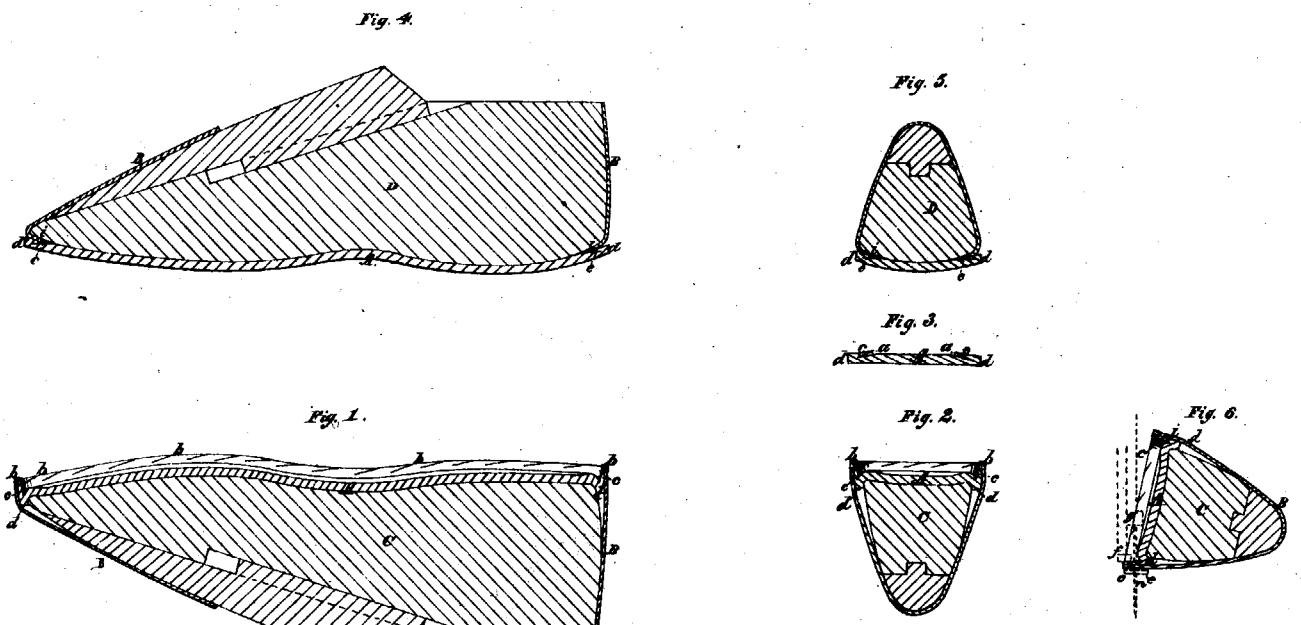
Witnesses,
James Laird
Lewis A. Tucker
Inventors,
L. Holden
S. P. Holden
per Munn & Co
Attorneys

UNITED STATES PATENT OFFICE.

LUTHER HOLDEN AND STOUGHTON B. HOLDEN, OF WOBURN, MASSACHUSETTS, ASSIGNORS, BY MESNE ASSIGNMENTS, TO THE McKAY TURNED SHOE COMPANY.

IMPROVEMENT IN BOOTS AND SHOES.

Specification forming part of Letters Patent No. 31,929, dated April 2, 1861; Reissue No. 1,841, dated December 27, 1864.

*To all whom it may concern:*

Be it known that LUTHER HOLDEN and STOUGHTON B. HOLDEN, both of Woburn, in the county of Middlesex and State of Massachusetts, have invented a new and useful Improvement in the Manufacture of Shoes and Boots, of which the following is a full, clear, and exact description, reference being had to the accompanying drawings, forming part of this specification.

The invention consists in an improved mode of preparing the sole and upper for sewing, by which the seam which unites them is made entirely on the outside of the shoe or boot in the sewing operation, said seam being subsequently brought entirely on the inside of the boot or shoe by turning the same. The especial object of this mode of preparing the sole and upper is to afford greater facility for sewing them together by a sewing-machine than is obtained by the common arrangement of the parts.

Figure 1 in the drawings represents a longitudinal section of a sole and upper prepared and lasted for sewing in accordance with this invention. Fig. 2 is a cross-section of the same. Fig. 3 is a cross-section of the sole before it is applied to the upper. Fig. 4 is a longitudinal section of the shoe on the finishing-last. Fig. 5 is a cross-section of the same. Fig. 6 is a sectional view illustrating the manner in which the sole and upper are sewed together upon a sewing-machine.

Similar letters of reference indicate corresponding parts in the several figures.

A represents the sole, cut from ordinary sole-leather or other suitable flexible substance. This, after being properly shaped, has a cut (see Fig. 3) made all around the inner surface, (or that surface which comes innermost in the finished shoe,) the cut being made near the edge of the sole to form the flap *c*, through which the stitches are made in sewing the upper to the sole. This flap, instead of being cut toward the center of the sole, is cut toward the edge. The edge *d* of the sole is then turned over toward the outer surface thereof, or that surface which is to be outward when the boot or shoe is finished, and by this means the flap *c* is caused to stand out at about right angles to the general surface of the sole, as shown at Figs. 1, 2, and 6. The sole is now temporarily secured to a "lasting-last," or short and narrow last, C, so that the turned edge of the sole lies upon that portion of the last which adjoins its sole-face. The upper B, having been "closed" and arranged inside out, is placed upon this last C, and is lasted or drawn closely thereto and secured temporarily in that condition, as shown in Figs. 1, 2, and 6, by stitches *b* or otherwise, the last C being enough smaller than the last D, on which the shoe is to be finished, to allow the whole of the portion *d* of the sole to be turned over the edge of the last. The shoe, now in the condition illustrated in the last-mentioned figures, is ready to be sewed upon a sewing-machine, by which operation the sole and upper are permanently united, the flap *c* and marginal portion of the upper being close together and standing out from the sole at right angles, or nearly so, to its general surface in such manner as to enable them to be sewed through and through, either by a sewing-machine or by hand, without any difficulty, both sides of the seam being presented on the outside of the shoe when in this condition and before it is turned.

In sewing by a machine the shoe is held in the position shown in Fig. 6, in which *e* is the bed or plate on which the work rests. *f* is the presser. *g* is the needle-bar, and *n* the needle. The seam is made quite close to the angle which the flap forms with the sole, the stitches being represented by *i*. When the seam is formed, the flap *c* and that part of the upper which is immediately thereunto connected are pressed down upon the sole, the superfluous parts of the upper are trimmed off, the last C extracted, and the shoe is turned while in a damp and pliable condition.

It may be here mentioned that in order to afford room for the needle-bar of the sewing-machine the sole of the last C may be made concave. After the shoe has been turned, the wider and longer finishing-last D is inserted within the shoe, which is afterward finished as is usual.

What is claimed as the invention is—

So preparing the sole and upper for sewing that the parts thereof to be sewed together are brought to the condition substantially as shown and described—that is to say, projecting from or beyond the sole at right angles, or nearly so, to the general surface thereof in such manner as to bring both faces of the seam on the outside of the work while the sewing is being performed.

Executed this 31st day of August, A. D. 1864.

THE McKAY TURNED SHOE COMPANY,
By DAVID L. WEBSTER,
*President.*
GORDON McKAY,
*Treasurer.*

In presence of—
J. B. CROSBY,
FRANCIS GOULD.